(12) United States Patent
Schwartz et al.

(10) Patent No.: US 9,891,122 B2
(45) Date of Patent: Feb. 13, 2018

(54) LOAD SENSING SYSTEM

(71) Applicant: GOODRICH ACTUATION SYSTEMS SAS, Buc (FR)

(72) Inventors: Laurent Schwartz, Orsay (FR); Arnaud de la Chevasnerie, Ville d'Avray (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days.

(21) Appl. No.: 14/666,955

(22) Filed: Mar. 24, 2015

(65) Prior Publication Data
US 2015/0268110 A1  Sep. 24, 2015

(30) Foreign Application Priority Data

Mar. 24, 2014  (EP) .................... 14305414

(51) Int. Cl.
*G01L 1/18* (2006.01)
*G01L 5/00* (2006.01)
*F16C 19/52* (2006.01)
*F16H 25/20* (2006.01)
*G01L 5/12* (2006.01)
*B64C 13/24* (2006.01)
*B64D 45/00* (2006.01)
*F16H 57/01* (2012.01)

(52) U.S. Cl.
CPC .......... *G01L 5/0061* (2013.01); *F16C 19/522* (2013.01); *F16H 25/2021* (2013.01); *B64C 13/24* (2013.01); *B64D 45/0005* (2013.01); *B64D 2045/0085* (2013.01); *F16H 2057/016* (2013.01); *G01L 1/18* (2013.01); *G01L 5/0009* (2013.01); *G01L 5/0019* (2013.01); *G01L 5/12* (2013.01)

(58) Field of Classification Search
CPC ....... G01L 5/0061; G01L 5/12; G01L 5/0019; G01L 5/0009; G01L 1/18; F16H 25/2021; F16H 2057/016; F16C 19/522; B64C 13/24; B64D 45/0005; B64D 2045/0085
USPC ................. 310/68 B, 338; 73/781, 788, 795, 73/862.06, 862.49
See application file for complete search history.

(56) References Cited

U.S. PATENT DOCUMENTS

| | | | | |
|---|---|---|---|---|
| 4,697,672 A | * | 10/1987 | Linton .................... | F16D 59/00 188/134 |
| 4,924,713 A | * | 5/1990 | Machino ............ | B23Q 17/0966 73/104 |
| 6,171,812 B1 | * | 1/2001 | Smith ...................... | A01N 1/02 435/284.1 |

(Continued)

FOREIGN PATENT DOCUMENTS

| | | |
|---|---|---|
| GB | 2327763 A | 2/1999 |
| WO | 2014037025 A1 | 3/2014 |

OTHER PUBLICATIONS

European Search Report for Application No. 14305414.6-1754, dated Sep. 1, 2014, 6 pages.

*Primary Examiner* — Jonathan Dunlap
(74) *Attorney, Agent, or Firm* — Cantor Colburn LLP

(57) ABSTRACT

An actuator including a pair of load sensors arranged in the load path through the actuator. The load sensors are antagonistically preloaded and their outputs electrically connected to a processor for calculating a load in the actuator from the difference in loads measured by the respective load sensors.

11 Claims, 1 Drawing Sheet

(56) References Cited

U.S. PATENT DOCUMENTS

| | | | | |
|---|---|---|---|---|
| 6,174,088 B1* | 1/2001 | Miyazaki | ............... | G01P 1/00 |
| | | | | 324/207.25 |
| 6,289,749 B1* | 9/2001 | Sanders | ............... | G01L 5/0061 |
| | | | | 73/862.49 |
| 6,360,616 B1* | 3/2002 | Halliday | ............... | G01L 5/0009 |
| | | | | 73/862.49 |
| 6,446,339 B2* | 9/2002 | Takamizawa | ............ | F16C 19/08 |
| | | | | 29/446 |
| 6,658,943 B2* | 12/2003 | McDearmon | ......... | F16C 19/522 |
| | | | | 73/795 |
| 7,971,490 B2* | 7/2011 | Fleury | ............... | G01L 5/0061 |
| | | | | 73/760 |
| 7,976,223 B2* | 7/2011 | Kapaan | ............... | B60B 27/00 |
| | | | | 384/544 |
| 8,312,783 B2* | 11/2012 | McKay | ............... | B64C 13/28 |
| | | | | 244/99.2 |
| 8,405,265 B2* | 3/2013 | Biehl | ............... | F16H 25/2472 |
| | | | | 310/68 B |
| 2007/0063620 A1* | 3/2007 | Kluft | ............... | B23Q 1/265 |
| | | | | 310/338 |
| 2007/0295110 A1 | 12/2007 | Hochhalter | | |
| 2008/0256790 A1* | 10/2008 | Cowles | ............... | F16C 11/0614 |
| | | | | 29/724 |
| 2009/0121399 A1* | 5/2009 | Hindle | ............... | B64G 1/286 |
| | | | | 267/140.15 |
| 2010/0096498 A1* | 4/2010 | McKay | ............... | B64C 13/28 |
| | | | | 244/99.2 |
| 2011/0057550 A1 | 3/2011 | Biehl | | |

* cited by examiner

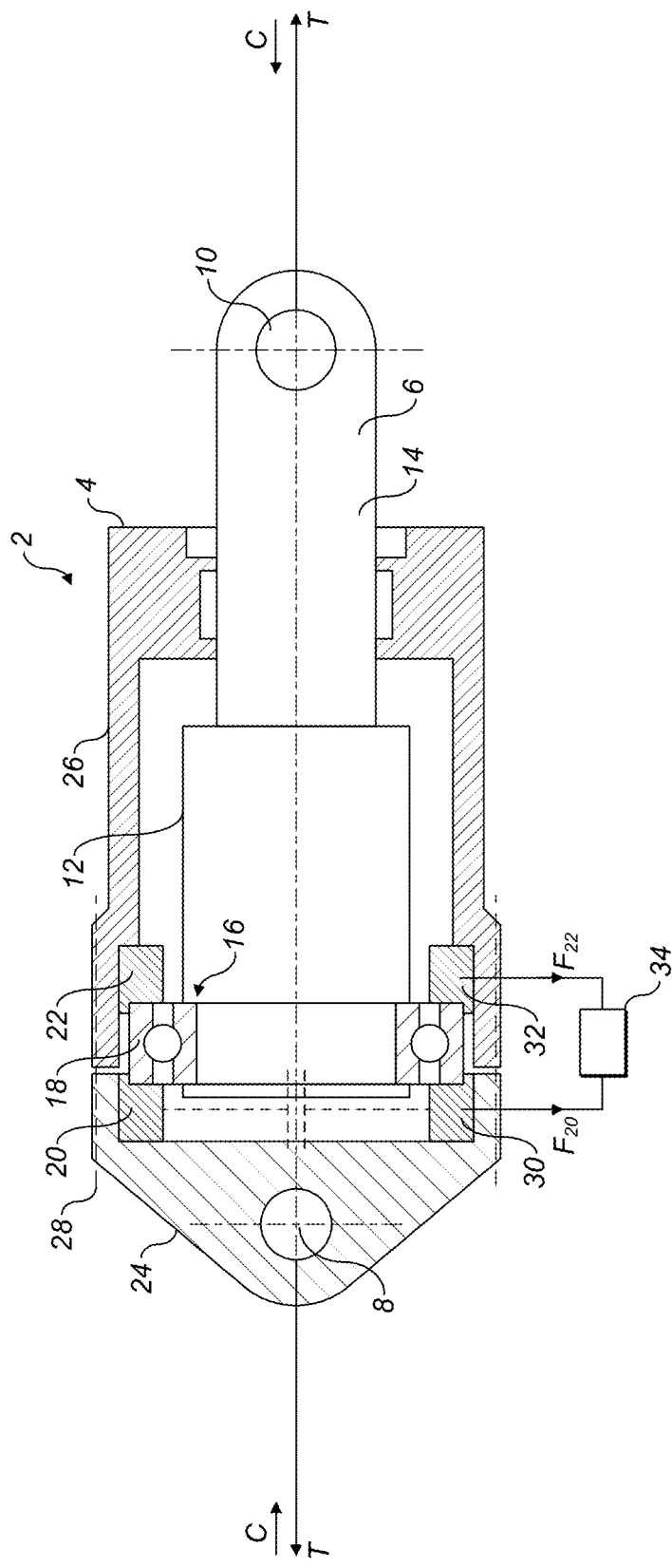

LOAD SENSING SYSTEM

FOREIGN PRIORITY

This application claims priority to European Patent Application No. 14305414.6 filed Mar. 24, 2014, the entire contents of which is incorporated herein by reference.

TECHNICAL FIELD

The present disclosure relates to a load sensing system and in particular, but not exclusively, to a load sensing system for use in an actuator, for example a flight control actuator.

BACKGROUND

Flight control actuators typically comprise a housing and a movable part extending from the housing. The housing may be attached to a static part of an aircraft structure while the movable part may be attached to a movable aircraft part such as a flight control surface, an undercarriage component, a thrust reverser cowl, a landing gear, a nose wheel steering mechanism, a tailboard and so on. Typically the housing and the movable actuator part are attached to the respective static and movable aircraft parts via pin, spherical or other connections.

It is frequently desirable to know the forces, both compressive and tensile that are exerted by the actuator on the aircraft. These forces are typically measured using load cells.

In a known arrangement, a load cell is arranged in the load path through the actuator, for example between a component coupled to the movable actuator part and the actuator housing. The load cell is preloaded in compression by an amount which exceeds the maximum tensile stress expected on the actuator in use such that the load cell does not become completely unloaded in use. If a tensile load is applied on the actuator, that load can be calculated by subtracting the measured load from the initial load. If a compressive load is applied that load can be calculated by subtracting the initial load from the measured load.

A potential disadvantage with this arrangement is that the calculation of the actual loads depends upon accurately knowing the preload on the load sensor. The degree of preload may vary over time, for example through stress relief or through temperature changes, which means that the load cell has to be carefully recalibrated at regular intervals. This is not convenient in practice.

SUMMARY

In an arrangement disclosed herein, a system for measuring a load in an actuator comprises a pair of load sensors arranged in the load path through the actuator. The load sensors are antagonistically preloaded and their outputs electrically connected for calculating the load from the loads measured by the respective load sensors.

Also disclosed herein is an actuator comprising a pair of load sensors arranged in the load path through the actuator. The load sensors are antagonistically preloaded and their outputs electrically connected for calculating a load in the actuator from the loads measured by the respective load sensors.

Due to the antagonistic preloading of the load sensors, the degree of preload is the same in each sensor. Thus should the preload of one load sensor change, the preload of the other sensor will automatically change by the same amount. In this way, the effect of any variation in the preload applied to the load sensors in calculating actuator loads is cancelled out and the actual load can be calculated purely from the loads measured by the load sensors.

In one embodiment, the load sensors are preloaded between sensor mounts with a load transfer element being sandwiched between the load sensors. The load sensors are antagonistically preloaded between the respective mounts and the load transfer element.

The sensor mounts may be provided in a static part of the actuator, for example a static housing and the load transfer element coupled to a movable actuator part.

In one embodiment, the load transfer element may comprise a bearing supporting a rotational part of the actuator, for example supporting the nut of a ballscrew or other screw type actuator.

However, it is not essential that the actuator has a rotating part supported by a bearing, and in other embodiments, the load transfer element may simply be a non-rotating or static element, for example a flange, which transfers the loads into the load sensors.

In one convenient arrangement, the sensors mounts are provided in opposed parts of the actuator housing which are fixed to one another by fasteners such as threaded fasteners such as screws, studs or bolts. The preload in the load sensors may then be adjusted by tightening the fastener or fasteners to a desired degree.

The mounts may be formed as respective locating shoulders.

The particular form of load sensor used will depend on the details of the actuator. In one embodiment, however, the sensors are load cells.

At least one load cell, and possibly both load cells, may be annular load cells, allowing the load cells to be arranged radially around internal components of the actuator.

To maintain a compact arrangement, the load cells may be so-called "pancake" load cells.

The system may also comprise a processor for receiving load signals from the load sensors and calculating the actuator load therefrom.

The processor may comprise means for subtracting the load measured by one of the load sensors from the load measured by the other sensor and dividing the remainder by 2 to calculate the actuator load.

Also disclosed herein is a method for calculating the load applied by or to an actuator, the method comprising providing comprises a pair of load sensors arranged in the load path through the actuator, antagonistically preloading the load sensors, connecting their outputs to a processor, the processor subtracting the load measured by one of the load sensors from the load measured by the other sensor and dividing the remainder by 2 to calculate the actuator load.

It will be understood that the actuator of this disclosure may be mounted in an aircraft for moving a component of the aircraft. Also, while in some embodiments the actuator housing may be mounted directly or indirectly to a static structure and the movable part mounted directly or indirectly to the component being moved, in some embodiments this may be reversed. In other embodiments, both the actuator housing and the movable part may be mounted to movable components, for example in a linkage.

BRIEF DESCRIPTION OF DRAWINGS

A non-limiting embodiment will now be described by way of example only with reference to the accompanying drawings in which:

FIG. 1 shows, schematically, an actuator incorporating a load measurement system in accordance with this disclosure.

DETAILED DESCRIPTION

With reference to FIG. 1, an actuator 2 comprises a housing 4 and a movable actuator part 6. A first pin connection 8 or other interface is provided on the housing 4 for mounting to a static structure (not shown) such as an aircraft airframe. A second pin connection 10 or other interface is provided on the movable actuator part 6 for connection to a movable structure (not shown) such as a movable aircraft surface such as a flap, aileron, spoiler, hatch, thrust reversing cowl, etc. The pin connectors 8, 10 are intended to receive pins, but it will be appreciated that other types of connectors, such as spherical connectors may be provided.

In this embodiment, the actuator 2 comprises a rotational to translational movement converter, such as a ballscrew. In the embodiment, a nut 12 is mounted on a screw shaft 14. The screw shaft 14 is prevented from rotating relative to the housing 4 by conventional means, and the nut 12 is rotated relative to the housing 4, for example by an electric motor (not shown) such that rotation of the nut 12 will cause the screw shaft 14 to either extend from or retract into the housing 4, depending on the direction of rotation of the nut 12.

The nut 12 is supported rotationally in the housing 4 by a bearing 16. As can be seen, the outer race 18 of the bearing 16 is sandwiched between first and second load sensors 20, 22 and acts to transfer the load from the nut 12 (and thus from the screw shaft 14) into the first and second load sensors 20, 22 and from there into the housing 4.

In this embodiment, the load sensors 20, 22 are load cells and in particular annular pancake type load sensors. Such sensors are widely available. The annular shape of the load cells 22, 24 allows them to be arranged around the actuator nut 12.

The housing 4 is formed in first and second sections 24, 26. The two sections 24, 26 are fixed together by threaded fasteners such as screws or bolts 28 (illustrated schematically), which may be arranged circumferentially around the housing 4. The first housing section 24 is provided with a first shoulder 30 for receiving the first load cell 20 and the second section 26 is provided with a second shoulder 32 for receiving the second load cell 22.

As can be seen, the first and second load cells 20, 22 and the bearing outer race 18 are retained between the first and second shoulders 30, 32. The fastening of the first and second housing sections 24, 26 will apply a compressive load to the first and second load cells 20, 22 and the bearing outer race 18. In this manner, the first and second load cells 20, 22 are antagonistically preloaded against one another through the bearing outer race 18 and will experience the same degree of preload.

The preload can be adjusted to a desired level by adjusting the screw fasteners 28. The preload should be such that the first and second load cells 20, 22 do not become fully unloaded when the actuator 2 is subject to either a tensile or compressive load in use.

As illustrated schematically, the first and second load cells 20, 22 are connected to a processor 34 which receives the outputs from the load cells 20, 22.

As will be understood from the FIGURE, if a preload Fi is applied to the load cells 20, 22 and a tensile force T is applied between the connections 8, 10, then the load $F_{20}$ measured by the first load sensor 20 will be Fi−T. In addition, the load $F_{22}$ measured by the second load sensor 22 will be Fi+T. The traction force T can be calculated in the processor by simply subtracting the first measured load $F_{20}$ from the second measured load $F_{22}$, and dividing by 2 as $(F_{22}-F_{20})/2=[(Fi+T)-(Fi-T)]/2=2T/2=T$.

Similarly, if a compressive load C is applied between the connections 8, 10, then the load $F_{20}$ measured by the first load sensor 20 will be Fi+C. The load $F_{22}$ measured by the second load sensor 22 will be Fi−C. The compressive force C can be calculated in the processor 34 by subtracting the first measured load $F_{20}$ from the second measured load $F_{22}$, and dividing by 2 as $(F_{22}-F_{20})/2=[(Fi-C)-(Fi+C)]/2=-2C/2=-C$. In this case as the result is a negative value, it represents a compressive force, rather than a tensile force.

The processor 34 can therefore calculate the tensile force using these simple equations.

The disclosed system has several advantages over prior art systems using just a single load sensor, since the load measurement is no longer affected by the load cell preload. Thus changes in the preload, which may occur due to stress relief or temperature changes for example, will no longer be of concern meaning that there is no need to calibrate the system as frequently. Load measurement is therefore much more reliable, providing for improved flight control systems where monitoring or limitation of forces is desirable.

It will be appreciated that the description above is of just one embodiment and that various changes and modifications may be made thereto without departing from the scope of the disclosure.

For example, while a rotational to translational actuator is illustrated, the disclosure is not limited to such, and would extend to other types of actuator such as linear actuators. Thus it is not essential that the load transfer element 16 sandwiched between the load cells 20, 22 is able to accommodate rotational movement of a movable actuator part. It could, for example, simply be a flange coupled to the movable actuator part in any convenient manner.

In addition, while an electrically powered actuator is described, the disclosure is not limited to such and the actuator may be operated by other means, for example hydraulically or pneumatically.

Also, while the load sensors 20, 22 are shown as being mounted in a static housing 4, they could be mounted on or coupled to a movable part, for example the nut 12, if a suitable load transfer element is provided on or coupled to the housing 4.

Also, in other arrangements, both pin connectors or interfaces 8, 10 may be attached to movable structures, for example where the actuator 2 forms part of a kinematic linkage. Thus the housing 4 may not be static, but also movable in absolute terms.

The invention claimed is:

1. A system for measuring a load in a ball screw actuator comprises a pair of load sensors arranged in the load path through the actuator, wherein the load sensors are antagonistically preloaded and their outputs electrically connected for calculating the load from the loads measured by the respective load sensors;

wherein the load sensors are preloaded between respective sensor mounts, with a load transfer element being sandwiched between the load sensors, wherein the load transfer element comprises the outer race of a bearing supporting a rotational nut of the ball screw actuator;

wherein the sensor mounts are formed as respective recessed shoulders in opposed first and second parts of an actuator housing which are fixed to one another by threaded fasteners wherein said first part of said actuator housing receiving the rotational nut and having an opening at one end of the actuator housing through which a screw shaft of the ball screw protrudes; and said second part of said actuator housing closing a second end of said actuator housing opposite said first end of said actuator housing.

2. The system of claim 1 wherein the load transfer element is coupled to an actuator part movable relative to the housing.

3. The system of claim 1, wherein the load transfer element comprises a bearing supporting a rotational part of the actuator.

4. The system of claim 1 wherein the sensors are load cells.

5. The system of claim 4 wherein one or both of the load cells are annular load cells.

6. The system of claim 4 wherein one or both of the load cells are pancake load cells.

7. The system of claim 1 further comprising a processor for receiving load signals from the load sensors and calculating the actuator load therefrom.

8. The system of claim 7 wherein the processor is configured to subtract the load measured by one of the load sensors from the load measured by the other sensor and dividing the remainder by 2 to calculate the actuator load.

9. A ball screw actuator comprising a pair of load sensors arranged in the load path through the actuator, wherein the load sensors are antagonistically preloaded and their outputs electrically connected for calculating a load in the actuator from the loads measured by the respective load sensors;

wherein the load sensors are preloaded between respective sensor mounts, with a load transfer element being sandwiched between the load sensors, wherein the load transfer element comprises the outer race of a bearing supporting a rotational nut of the ball screw actuator;

wherein the sensor mounts are formed as respective recessed shoulders in opposed first and second parts of an actuator housing which are fixed to one another by threaded fasteners wherein said first part of said actuator housing receiving the rotational nut and having an opening at one end of the actuator housing through which a screw shaft of the ball screw protrudes; and said second part of said actuator housing closing a second end of said actuator housing opposite said first end of said actuator housing.

10. The actuator of claim 9 wherein the load transfer element is coupled to an actuator part movable relative to the housing.

11. The actuator of claim 9 wherein the load transfer element comprises a bearing supporting a rotational part of the actuator.

* * * * *